United States Patent
Watanabe et al.

(10) Patent No.: US 8,041,736 B1
(45) Date of Patent: Oct. 18, 2011

(54) METHOD AND SYSTEM FOR MAINTAINING DISK LOCATION VIA HOMENESS

(75) Inventors: Steven S. Watanabe, San Jose, CA (US); Stephen H. Strange, Mountain View, CA (US); Susan M. Coatney, Cupertino, CA (US)

(73) Assignee: NetApp, Inc., Sunnyvale, CA (US)

( * ) Notice: Subject to any disclaimer, the term of this patent is extended or adjusted under 35 U.S.C. 154(b) by 47 days.

(21) Appl. No.: 12/716,770

(22) Filed: Mar. 3, 2010

Related U.S. Application Data

(63) Continuation of application No. 11/606,538, filed on Nov. 30, 2006, now Pat. No. 7,711,683.

(51) Int. Cl.
*G06F 17/30* (2006.01)

(52) U.S. Cl. .................................... 707/783

(58) Field of Classification Search ............ 707/803, 707/783, 784, 785, 786; 370/216, 230, 240; 709/216, 217, 223, 226; 714/5
See application file for complete search history.

(56) References Cited

U.S. PATENT DOCUMENTS

| | | | |
|---|---|---|---|
| 4,570,217 A | 2/1986 | Allen et al. |
| 5,124,987 A | 6/1992 | Milligan et al. |
| 5,163,131 A | 11/1992 | Row et al. |
| 5,202,979 A | 4/1993 | Hillis et al. |
| 5,278,979 A | 1/1994 | Foster et al. |
| 5,403,667 A | 4/1995 | Simoens |
| 5,581,724 A | 12/1996 | Belsan et al. |
| 5,956,734 A | 9/1999 | Schmuck et al. |
| 6,061,770 A | 5/2000 | Franklin |
| 6,081,875 A | 6/2000 | Clifton et al. |
| 6,119,244 A | 9/2000 | Schoenthal et al. |
| 6,205,481 B1 | 3/2001 | Heddaya et al. |
| 6,292,905 B1 | 9/2001 | Wallach et al. |
| 6,341,341 B1 | 1/2002 | Grummon et al. |
| 6,347,248 B1 | 2/2002 | Gliner |
| 6,446,751 B1 | 9/2002 | Ahuja |
| 6,625,747 B1 | 9/2003 | Tawil et al. |
| 6,671,773 B2 | 12/2003 | Kazar et al. |
| 6,728,897 B1 | 4/2004 | Cramer et al. |
| 6,920,579 B1 | 7/2005 | Cramer |
| 6,920,580 B1 | 7/2005 | Cramer |
| 7,127,577 B2 | 10/2006 | Koning et al. |

(Continued)

OTHER PUBLICATIONS

Akyurek, Sedat, *Placing Replicated Data to Reduce Seek Delays*, Department of Computer Science, University of Maryland, UMIACS-TR-91-121, CS-TR-2746, Aug. 1991.

(Continued)

*Primary Examiner* — Diane Mizrahi
(74) *Attorney, Agent, or Firm* — Cesari and McKenna, LLP

(57) ABSTRACT

A method and system manages ownership information about disks in a storage network without the need for an emulated, partner mode system. The method and system provides for ownership information, including a current owner and a home owner for resources, such as disks, to be stored on each disk in a storage system, as well as to be stored in memory on each storage system node in the network. A further aspect of the invention is a disk homeness application program interface (API), which provides commands that can be utilized by an administrator at a host computer to set, modify and disco play ownership information about each disk in the cluster. Upon a takeover, any node in the network can takeover one or more disks by reading the ownership information stored on the disks or in the tables.

18 Claims, 9 Drawing Sheets

U.S. PATENT DOCUMENTS

| | | | |
|---|---|---|---|
| 7,231,489 B1 | 6/2007 | Larson et al. | |
| 7,260,678 B1 | 8/2007 | Agarwal et al. | |
| 7,260,737 B1 | 8/2007 | Lent et al. | |
| 7,272,613 B2 | 9/2007 | Sim et al. | |
| 7,376,679 B2 | 5/2008 | Pasupathy | |
| 7,546,302 B1 | 6/2009 | Coatney et al. | |
| 7,613,947 B1 | 11/2009 | Coatney et al. | |
| 7,808,918 B2 * | 10/2010 | Bugenhagen | 370/242 |
| 2002/0116593 A1 | 8/2002 | Kazar et al. | |
| 2002/0174207 A1 | 11/2002 | Battou | |
| 2002/0188711 A1 | 12/2002 | Meyer | |
| 2003/0120743 A1 | 6/2003 | Coatney | |
| 2004/0003068 A1 | 1/2004 | Boldman et al. | |
| 2004/0030668 A1 | 2/2004 | Pawlowski et al. | |
| 2005/0193226 A1 | 9/2005 | Ahmed et al. | |
| 2006/0218210 A1 | 9/2006 | Sarma et al. | |
| 2007/0118706 A1 | 5/2007 | Pepper | |
| 2007/0124453 A1 | 5/2007 | Slaughter et al. | |
| 2010/0067369 A1 * | 3/2010 | Deishi | 370/216 |
| 2011/0145723 A1 * | 6/2011 | Walsh et al. | 715/745 |
| 2011/0161618 A1 * | 6/2011 | Bellows et al. | 711/202 |

OTHER PUBLICATIONS

Bitton, Dina, *Disk Shadowing*, Proceedings of the 14$^{th}$ VLDB Conference, LA, CA 1988.

Chaudhuri, Surajit, et al., *Self-Tuning Technology in Microsoft SQL Server*, Data Engineering Journal 22, 2 1999 pp. 20-27.

Chutani, Sailesh, et al., *The Episode File System*, In Proceedings of the USENIX Winter 1992.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87/1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063, 1988.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, 2 1999 pp. 33-40.

Kent, Jack et al., *Optimizing Shadow Recovery Algorithms*, IEEE Transactions on Software Engineering, 14( 2): 155-168 , Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOND Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering and Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, 2 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, 2 1999 pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, 2 1999 pp. 28-32.

Weikum, Gerhard, et al., *Towards Self-Tuning Memory Management for Data Servers*, Data Engineering Journal 22, 2 1999 pp. 3-11.

West, Michael, et al. *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

ANSI X3.230, 1994, Fibre Channel Physical and Signaling Interface (FC-PH), 430 pages.

Snively, Bob. "New Identifier Formats Based on IEEE Registration X3T11/96-467", revision 2, 5 pages, 1996.

U.S. Appl. No. 10/011,844 entitled Efficient Use of NVRAM During Takeover in a Node Cluster, filed Dec. 4, 2001 by Abhijeet Gole, 34 pages.

U.S. Appl. No. 11/606,538 entitled Method and System for Maintaining Disk Location Via Homeness, filed Nov. 30, 2006 by Steven S. Watanabe, 46 pages.

\* cited by examiner

700

| VOLUME ID | 705 |
|---|---|
| AGGREGATE ID | 710 |
| ⋮ | 715 |

| AGGREGATE ID | 805 |
|---|---|
| D-MODULE ID | 810 |
| ⋮ | 815 |

FIG. 8

METHOD AND SYSTEM FOR MAINTAINING DISK LOCATION VIA HOMENESS

CROSS REFERENCE TO RELATED APPLICATIONS

This application is related to the following United States Patent Applications:

U.S. Pat. No. 7,613,947, issued on Nov. 3, 2009, entitled SYSTEM AND METHOD FOR STORAGE TAKEOVER, by Susan M. Coatney et al., which is presently incorporated by reference herein in its entirety; and U.S. Pat. No. 7,546,302, issued on Jun. 9, 2009 entitled, METHOD AND SYSTEM FOR IMPROVED RESOURCE GIVEBACK by Susan M. Coatney, et al., which is presently incorporated by reference herein in its entirety.

The present application is a continuation of commonly assigned U.S. patent application Ser. No. 11/606,538, which was filed on Nov. 30, 2006 now U.S. Pat. No. 7,711,683, by Steven S. Watanabe for a METHOD AND SYSTEM FOR MAINTAINING DISK LOCATION VIA HOMENESS and is hereby incorporated by reference.

BACKGROUND OF THE INVENTION

1. Field of the Invention

The present invention relates to networked storage systems and, more particularly, to procedures for maintaining disk location information within such systems.

2. Background Inform

A storage system is a computer that provides storage service relating to the organization of information on writeable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of data containers, such as directories and files on, e.g. the disks. Each "ondisk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of semantic level of access to files and file systems. Storage of information on a NAS system is typically deployed over a computer is network comprising a geographically distributed collection of interconnected communication links, such as Ethernet, that allow clients to remotely access the information (files) on the file server. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (FCP) or TCP/IP/Ethernet (iSCSI). A SAN arrangement or deployment allows decoupling of storage from the storage system, such as an application server, and some level of storage sharing at the application server level. There are, however, environments wherein a SAN is dedicated to a single server. When used within a SAN environment, the storage system may be embodied as a storage appliance that manages access to information in terms of block addressing on disks using, e.g., a logical unit number (LUN) in accordance with one or more block-based protocols, such as FCP.

One example of a SAN arrangement, including a multi-protocol storage appliance suitable for use in the SAN, is described in United States Patent Application Publication No. US2004/0030668 A1, filed on Feb. 14, 2004, entitled MULTI-PROTOCOL STORAGE APPLIANCE THAT PROVIDES INTEGRATED SUPPORT FOR FILE AND BLOCK ACCESS PROTOCOLS by Brian Pawlowski et al., which is incorporated herein by reference in its entirety.

It is advantageous for the services and data provided by a storage system, such as a storage node, to be available for access to the greatest degree possible. Accordingly, some storage systems provide a plurality of storage system nodes organized as a cluster, with a first storage system node coupled to and cooperating with a second storage system node. Each storage system node is configured to takeover serving data access requests for the other storage system node if the other node fails. The storage nodes in the cluster notify one another of continued operation using a heartbeat signal exchanged over a cluster interconnect and a cluster switching fabric. If one of the storage system nodes detects the absence of a heartbeat from the other storage node over both the cluster interconnect and the cluster switching fabric, a failure of the other node is assumed and a takeover procedure is initiated. The node failure is also usually confirmed by the surviving storage node using a mailbox mechanism of the other storage node to confirm that, in fact, a failure of the other storage node has occurred, rather than simply a failure of the cluster node coupling.

Specifically, the mailbox mechanism includes a set of procedures for determining the most up-to-date coordinating information through the use of one or more "master mailbox" disks. Such disks receive messages from the storage node with which they are associated in order to confirm that the node continues to be in communication with the disks and that the node continues to be capable of writing to other disks coupled to that node. Further details on the configuration and operation of the master mailbox disk are provided in commonly-owned U.S. Pat. No. 7,231,489, of Larson et al., for a SYSTEM AND METHOD FOR COORDINATING CLUS- TER STATE INFORMATION, issued on Jun. 12, 2007, which is presently incorporated by reference herein in its entirety.

Many such cluster configurations that have a plurality of storage system nodes, is operate using the concept of partnering (i.e., "partner mode"). Specifically, each storage system node in the cluster is partnered with a second storage system node in such a manner that the partner storage system node is available to take over and provide the services and the data otherwise provided by the second storage system node upon a failure of the second node. That is, upon such a failure, the partner assumes the tasks of processing and handling any data access requests normally processed by the second storage system node. One such example of a partnered storage system cluster configuration is described in U.S. Pat. No. 7,260,737, entitled SYSTEM AND METHOD FOR TRANSPORT-LEVEL FAILOVER OF FCP DEVICES IN A CLUSTER, by Arthur F. Lent, et al., issued on Aug. 21, 2007, the contents of which are hereby incorporated by reference. It is further noted that in such storage system node clusters, an administrator may desire to take one of the storage system nodes offline for a variety of reasons including, for example, to upgrade hardware, etc. In such situations, it may be advantageous to perform a "voluntary" user-initiated takeover operation, as opposed to a failover operation. After the takeover operation is complete, the storage system node's data is serviced by its partner until a giveback operation is performed.

In such cases employing a partner mode, additional infrastructure is often required. For example, requests are tracked to determine whether they are partner requests, and applicable data structures are duplicated. Separate data structures or tables describing the data, such as for example, a volume location database (VLDB) are maintained for the local disks and for the partner disks. In addition, registry files which store options and configuration parameters are also maintained separately in a local registry file and a partner registry file. As will be apparent to those skilled in the art, this results in additional code complexity in many systems. Moreover, if a partner mode is not used, it could be difficult for the takeover node, or for an administrator, to determine disks which have been assigned to a failed partner if the partner's ownership information is not available.

In some storage system architectures, each storage node in the cluster is generally organized as a network element (N-module) and a disk element (D-module). The N-module includes functionality that enables the node to connect to clients over a computer is network while each D-module connects to one or more storage devices, such as the disks. The disks are arranged as one or more aggregates containing one or more volumes. A file system architecture of this type is generally described in U.S. Pat. No. 6,671,773 entitled METHOD AND SYSTEM FOR RESPONDING TO FILE SYSTEM REQUESTS, by M. Kazar et al., issued on Dec. 30, 2003 (the contents of which are zo incorporated herein by reference in entirety).

Extensions to such architectures include the assignment of certain functionality to the D-module that was previously performed by the N-module. For example, the N-module is generally responsible for network connectivity, while the D-module performs functions relating to data containers and data access requests to those containers. In some designs, the N and D-module pairs are partnered in such a manner that, during a failover, the surviving N-module and D-module take over network addresses and perform other administrative tasks for the failed N and D-modules. However, in a cluster that does not have a one-to-one pairing between N and D-modules, and may have multiple nodes in a cluster, there is not a readily available technique for identifying the resources, e.g., disks, that are to be taken over by one or more nodes, and subsequently returned to the previously failed node that has been brought back into service. Some ownership information is stored on-disk such as that described in commonly owned U.S. Pat. No. 7,650,412 of Coatney et al., issued on Jan. 19, 2010, which is presently incorporated herein by reference. This on disk information, however, is not generally utilized for disk reassignment on takeovers, send homes and disk topology reconfigurations.

There remains a need, therefore, for a multi-node cluster system that is configured to provide ownership information about the disks served by the nodes in the cluster so that any of the D-modules in the cluster can locate resources served by the cluster, and further such that all or a portion of those resources can be assigned or reassigned to any other D-module in the cluster, or to more than one D-module in the cluster.

SUMMARY OF THE INVENTION

The disadvantages of prior techniques are overcome by the present invention which provides a method and system which allows for ownership information pertaining to resources, such as disks, to be stored on each disk in a storage system cluster, as well is as to be stored in memory on each storage system node in the cluster. A further aspect of the invention is a disk homeness application program interface (API), which provides commands that can be utilized by an administrator at a host computer to set, modify and display ownership information about each disk in the cluster.

In accordance with the invention, the ownership information is referred to herein to as "homeness" information (and is also sometimes referred to generally herein as home owner information). Homeness information includes a "current owner" and a "home owner." A disk's current owner is the storage system node that is assigned to handle data access requests directed to that disk. A disk's home owner is the node to which the disk is originally assigned and, which owns the disk if the node is fully operational. Typically, on initialization of a cluster, the disk homeness API is used to set the home owner and current owner to the same node, which node is originally assigned to handle data access requests for that disk upon initialization.

Once set by the administrator using the disk homeness API, the ownership information is written to each disk in an ownership location on each disk. Illustratively, the ownership location on each disk may be a sector, or other portion of the media, which is referred to herein as the ownership location. There may be more than one ownership location on a disk, if for example, a first node is assigned to handle data access requests for data on a first portion of the disk, and a second node is assigned to handle data access requests to a second portion of the disk.

After the ownership information has been set, a data structure, e.g., an ownership table, is created in the memory of each node. This table is maintained by an ownership module of the storage operating system of each node, and illustratively, on the D-module. The ownership table stores the homeness information regarding each disk in the cluster. This homeness information includes fields which identify the "current owner" and the "home owner."

Upon takeover, a disk iterator module on a takeover node checks the ownership table, if available, and passes appropriate homeness information to a takeover monitor, which then issues the appropriate instructions to take over the disks which are assigned to the failed node based on that information. If the table is not available, the takeover node checks the ownership location information on each disk in the cluster to identify the disks currently served by the failed node. Thus, the takeover node does not need to be in a partner mode configuration with the failed D-module in order to perform a takeover. Instead, any D-module in the cluster can access the homeness information either on-disk or "in-core" (i.e., in a table in memory) to obtain the ownership information about each disk associated with a failed D-module. Similarly, during a send home operation (performed once the failed node is brought back into service), the in-core ownership table can be consulted or the on-disk ownership location can be read to determine the proper homeness of a disk and to thus give back that resource to the intended D-module.

Using this technique, more than one D-module can take over the disks of a failed D-module such that the disks taken over can be distributed across multiple D-modules for load balancing or for other reasons. In accordance with the disk homeness API, a disk assign command can be used to update the owner information after a failed node is revived and the disks are sent home to it. In a maintenance mode, the disk reassign command can modify current home owner information, if necessary. A storage disk show command displays both current owner and home owner information for an administrator, in accordance with the invention.

BRIEF DESCRIPTION OF THE DRAWINGS

The above and further advantages of the invention may be better understood by reference to the following description in conjunction with the accompanying drawings in which like reference numerals indicate identical or functionally similar elements;

FIG. 7 is a schematic block diagram of a volume location database (VLDB) volume entry in accordance with an illustrative embodiment of the present invention;

FIG. 8 is a schematic block diagram of a VLDB entry in accordance with an illustrative embodiment of the present invention;

DETAILED DESCRIPTION OF AN ILLUSTRATIVE EMBODIMENT

A. Cluster Environment

Figure 1:
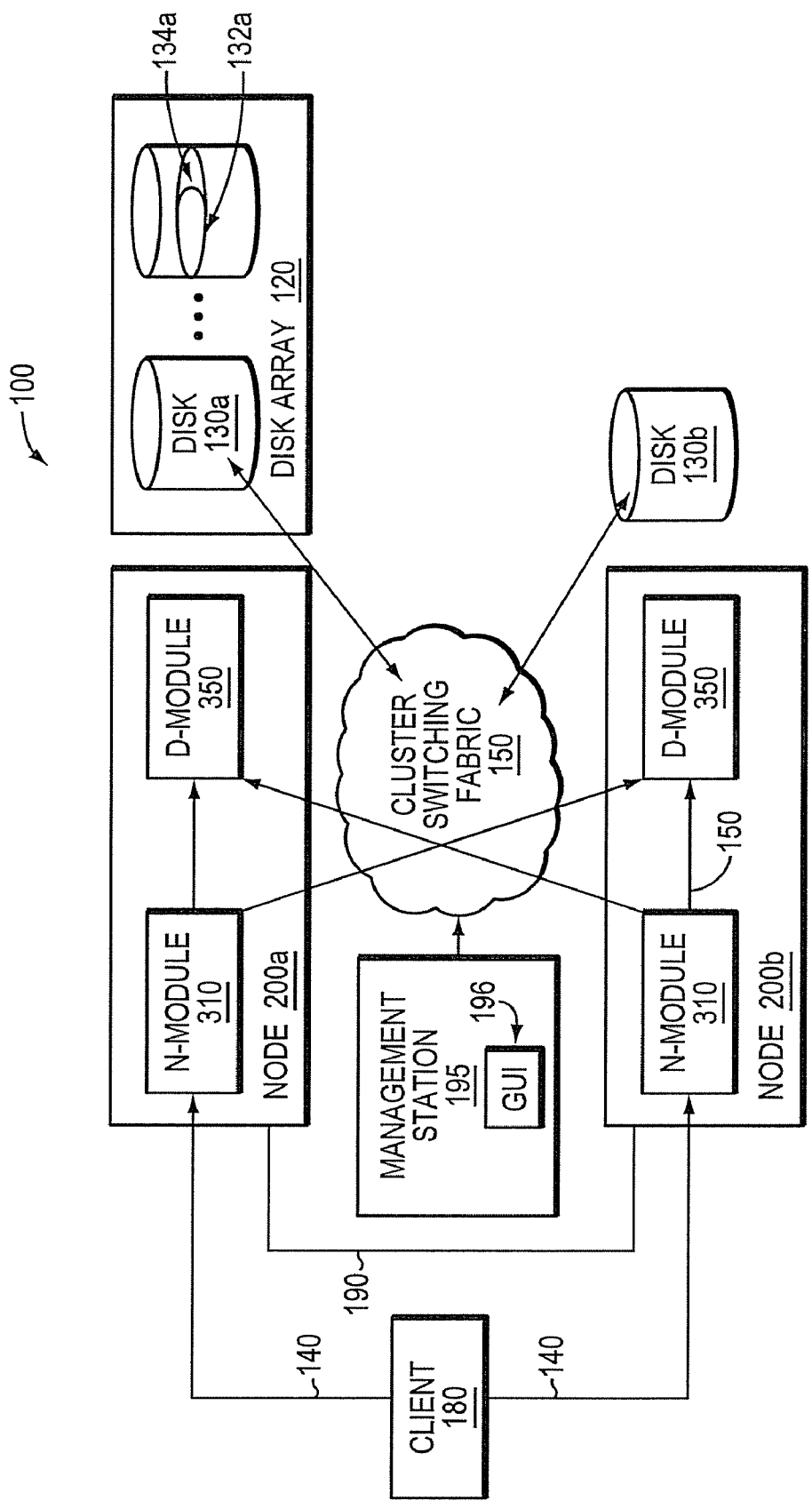
FIG. 1 is a schematic block diagram of a plurality of nodes interconnected as a cluster in accordance with an illustrative embodiment of the present invention.

FIG. 1 is a schematic block diagram of a plurality of nodes 200 $a,b$ interconnected as a cluster 100 and configured to provide storage services relating to the organization of information on storage devices. The nodes 200 $a,b$ comprise various functional components that cooperate to provide a distributed storage system architecture of the cluster 100. To that end, each node 200 $a,b$ is generally organized as a network element (N-module 310) and a disk element (D-module 350). The N-module 310 includes functionality that enables the node 200$a$, for example, to connect to clients 180 over a computer network 140, while each D-module 350 connects to one or more storage devices, such as is disks 130$a$. The nodes 200 $a,b$ are interconnected by a cluster switching fabric 150 which, in the illustrative embodiment, may be embodied as a Gigabit Ethernet switch. An exemplary distributed file system architecture is generally described in U.S. Pat. No. 6,671,773 entitled METHOD AND SYSTEM FOR RESPONDING TO FILE SYSTEM REQUESTS, by M. Kazar et al., issued Dec. 30, 2003, which is incorporated by reference herein in its entirety. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 200 $a,b$ comprising one N-module and one D-module should be taken as illustrative only.

The nodes 200 $a,b$ are also coupled across a cluster interconnect 190 which provides an additional communication path between the nodes. The cluster interconnect 190 may be Fibre Channel (FC), InfiniBand or another suitable medium. The cluster interconnect 190 may be used to provide heartbeat signals ("heartbeats") between the two nodes, which signals are used monitor the active state of each node. The cluster heartbeats are also sent across the cluster switching fabric 150 over which communications between an N-module and D-module are illustratively effected through remote message passing over the cluster switching fabric 150 The "death" of a node is indicated by the loss of heartbeat from both the cluster interconnect and the cluster switching fabric. The cluster interconnect is sometimes also referred to as the storage takeover interconnect. That is, as described further hereinafter, if the heartbeat terminates (i.e., "times out"), then a takeover procedure is enabled.

The clients 180 may be general-purpose computers configured to interact with the nodes 200 $a,b$ in accordance with a client/server model of information delivery. That is, is each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

A management station 195, sometimes referred to as an M-host, also communicates over the cluster switching fabric 150. This management station is operated and controlled by an administrator who may send instructions in a maintenance mode of the cluster whereby the administrator can assign disks, reassign disks or otherwise modify the disk topology or other configuration of the cluster 100. The management station 195 illustratively contains a graphic user interface 196 or a command line interface (CLI, not shown) whereby the user can interact with the software running on the management station 195 in order to maintain, configure and control the system 100.

During normal cluster operations, the storage system node (e.g., node 200a) that is connected to a set of disks 130a is identified as the "home owner" of the disks 130a. That storage system node is primarily responsible for servicing data requests directed to blocks on volumes contained on its set of disks. It is also the disk's "current owner." For example, the storage system node 200a is primarily responsible for the volumes of the disk array 120 which are represented as disks 130a. Thus, node 200a is the home owner and the current owner of the disks 130a. Similarly, the storage system node 200b is primarily responsible for the disks in the volumes represented as disk 130b and thus, node 200b is the current owner and the home owner of the disk 130b. As described in further detail herein, a disk platter 132a includes a portion of the media identified schematically by reference character 134a in FIG. 1, referred to herein as ownership location 134a, in which disk ownership information described herein is stored. As noted, the clustered is storage system 100 is configured such that any storage system node 200a or 200b (or other nodes in a multi-node cluster) can take over data servicing capabilities for another storage system node in the event of a failure in the manner described further herein.

B. Storage System Node

Figure 2:
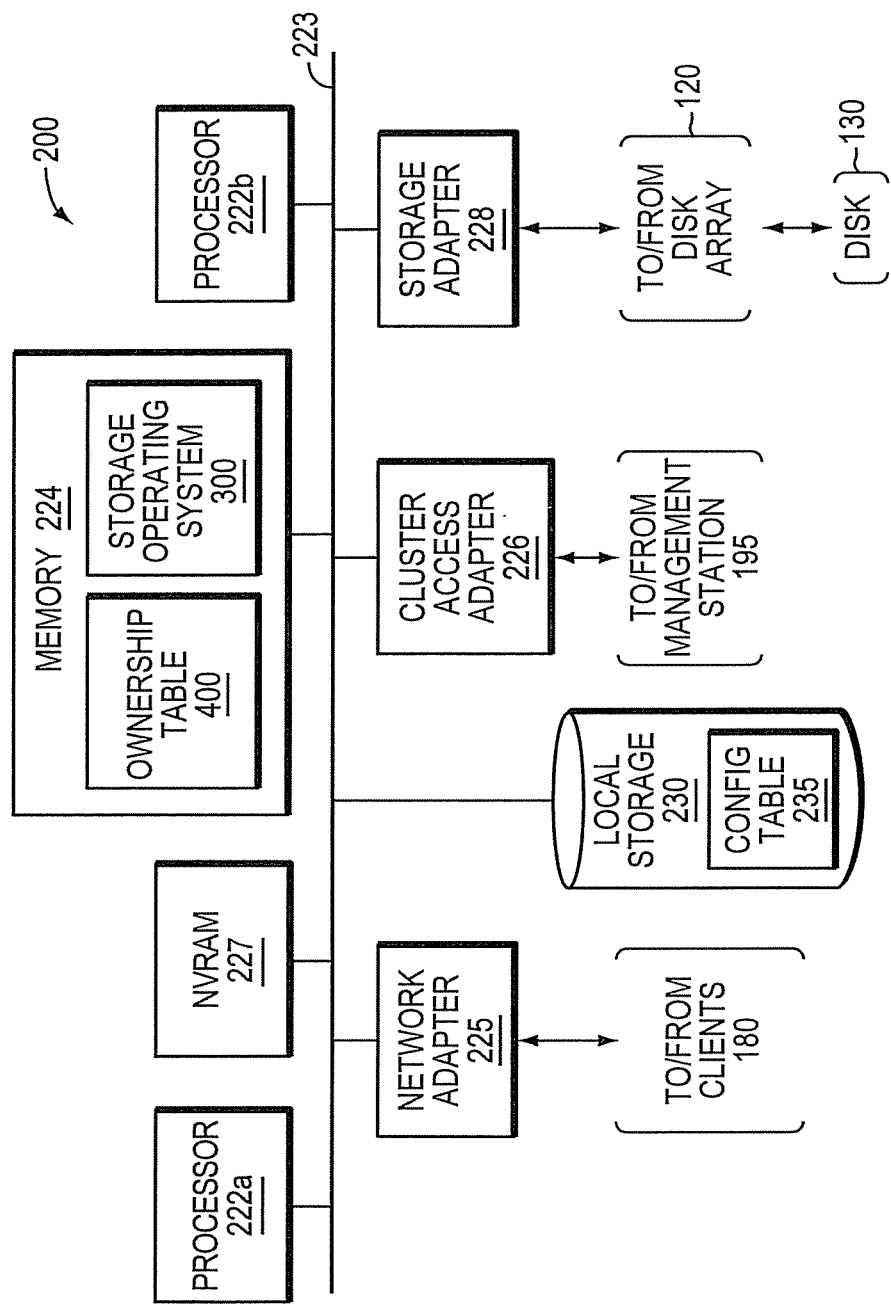
FIG. 2 is a schematic block diagram of a node in accordance with an illustrative embodiment of the present invention.

FIG. 2 is a schematic block diagram of a node 200 that is illustratively embodied as a storage system comprising a plurality of processors 222 a, b, a memory 224, a network adapter 225, a cluster access adapter 226, NVRAM 227 (non-volatile random access memory), a storage adapter 228 and local storage 230 interconnected by a system bus 223. The local storage 230 comprises one or more storage devices, such as disks, which can be utilized by the node to locally store configuration information (e.g., in configuration table 235) provided by one or more management processes that execute as user mode applications 600 (see FIG. 6). Alternatively, such information may be stored remotely. The cluster access adapter 226 comprises a plurality of ports adapted to couple the node 200 to other nodes of the cluster 100 or to the management station 195. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 300 that preferably implements a high-level module, such as a file system, to logically organize the information as a hierarchical structure of named data containers, such as directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-module 310 on the node, while the other processor 222b executes the functions of the D-module 350.

The memory 224 illustratively comprises storage locations that are addressable by the processors and adapters for storing software program code and data structures, such as ownership table 400, associated with the present invention. The processor and adapters may, in turn, comprise processing elements and/or logic circuitry configured to execute the software code and manipulate the data structures. The storage operating system 300, portions of which are typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 (FIG. 1) may be embodied as an Ethernet network or a FC network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130. The storage adapter comprises a plurality of ports having input/output (I/O) interface circuitry that couples to the disks over an I/O interconnect arrangement, such as a conventional high-performance, FC link topology.

Storage of information on each disk array 120 is preferably implemented as one or more storage "volumes" that comprise a collection of physical storage disks 130 cooperating to define an overall logical arrangement of a volume block number (vbn) space on the volume(s). Illustratively, the disks may be part of an aggregate that contains the volumes. Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data, once all of the disks in a given RAID group are assimilated. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named data containers such as directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of data containers such as blocks on the disks that are exported as named logical unit numbers (LUNs).

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 3:
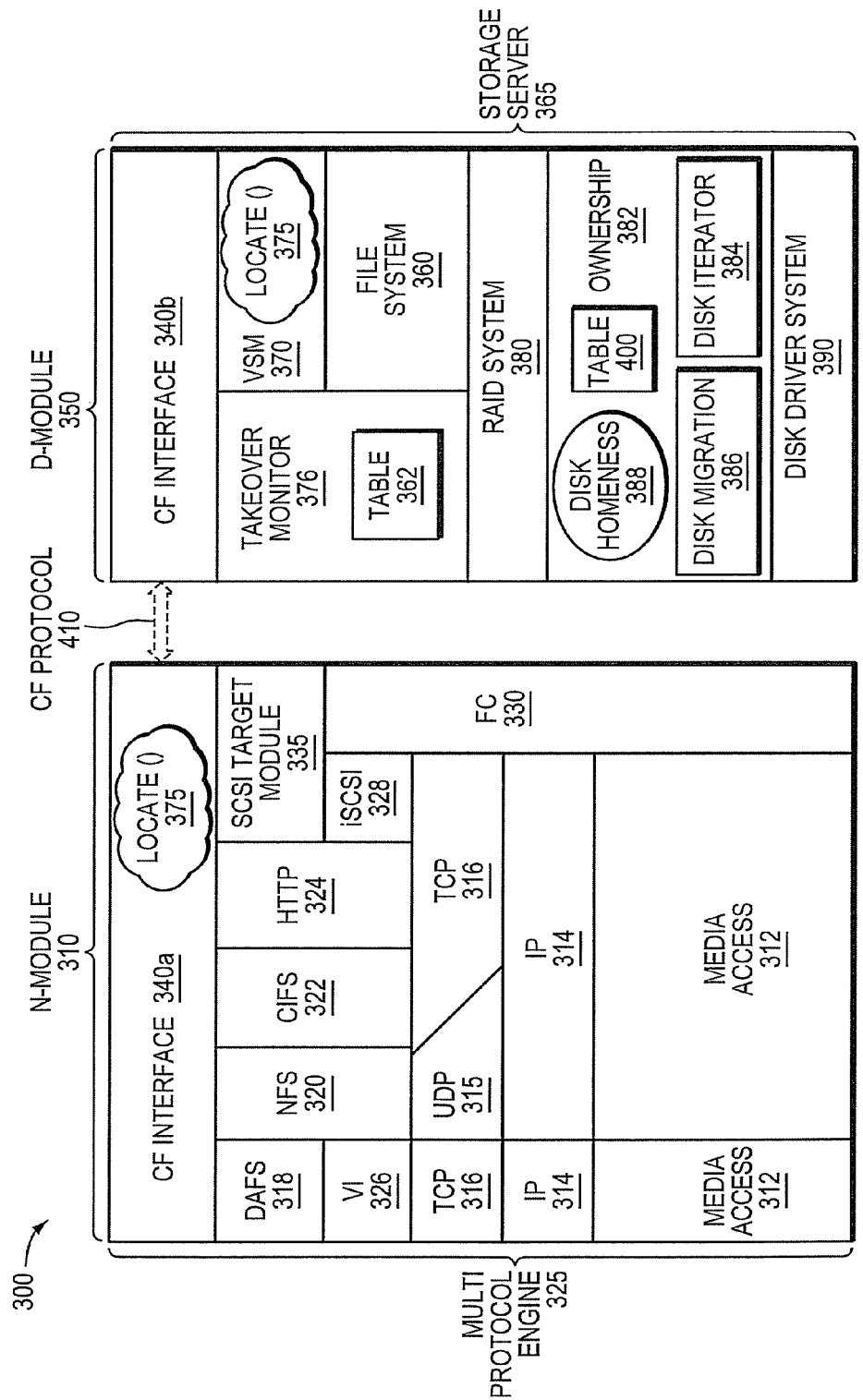
FIG. 3 is a schematic block diagram of a storage operating system that may be advantageously used with an illustrative embodiment of the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSIspecific access control to the blocks and, thus, manage exports of LUNs to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. As described further herein, the software layers of the storage server are illustratively embodied as a D-module 350. The storage server 365 illustratively comprises a takeover monitor module 376 that maintains a data structure such as the takeover monitor resource table 362. It should be understood that the takeover monitor resource table 362 is not the only possible embodiment of the data structure, but it is described herein for illustrative purposes. The takeover monitor resource table 362 is configured to maintain information regarding a takeover procedure as described further herein. The file system module 360 interacts in cooperating relation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the Small Computer System Interface (SCSI) protocol. However, it should be understood that processes other than the RAID system 380 may in other embodiments perform such tasks while remaining within the scope of the present invention.

The VSM 370 illustratively implements a striped volume set (SVS) and, as such cooperates with the file system 360 to enable storage server 365 to service a volume of the SVS. In particular, the VSM 370 implements a Locate( ) function 375 to compute the location of data container content in the SVS volume to thereby ensure consistency of such content served by the cluster.

A disk ownership module 382 manages ownership of the disks using, for example, one or more data structures such as tables, including, for example, the disk ownership table 400. In particular, the ownership module 382 cooperates with the disk driver system 390 to identify the appropriate D-module for processing data access requests for particular volumes on the disk array 120, and cooperates with the RAID subsystem 380, which manages aggregates, and with the file system 360, which manages flexible volumes, in the illustrative embodiment of the invention. To that end, the ownership module consults disk ownership table 400, which contains disk ownership information that is illustratively generated at boot-up time, and that is updated by disk homeness API 388 (as described in further detail herein) of the storage operating system to reflect changes in ownership of disks. More specifically, a disk iterator module 384 and a disk migration is module 386 cooperate to identify ownership information in the ownership layer 382, and to change on-disk reservations and ownership information in response to a takeover procedure or a send home procedure. In other words, the disk ownership module 382 includes program instructions for writing predefined ownership information at a proper location on each disk, which as noted is illustratively identified herein as the ownership location, such a sector on the disk, such as the disk platter 132a (FIG. 1) and which sector is a portion of the media identified schematically by reference character 134a in FIG. 1, referred to herein as ownership location 134a. The disk ownership module also includes program instructions for asserting and eliminating SCSI reservation tags, in response to commands received and generated by disk iterator 384 and disk migration module 386.

A takeover or send home procedure is invoked and controlled by a takeover monitor process 376, which follows a list of tasks to be performed for each procedure, stored in an associated takeover monitor resource table 362 of the takeover monitor process 376. These procedures are described in detail in the above-cited U.S. patent application Ser. No. 11/606,727.

Figure 4:
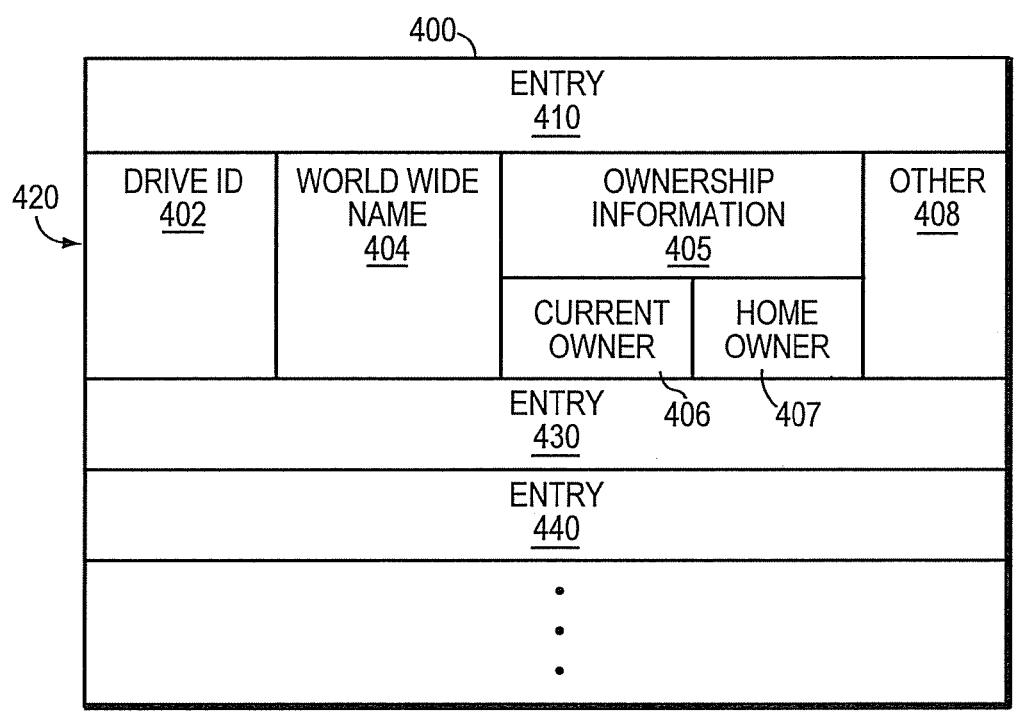
FIG. 4 is an illustrative example of a disk ownership table maintained by the ownership module of the storage operating system in which the homeness information in accordance with present invention is illustrated.

FIG. 4 is an illustrative example of the disk ownership table 400 stored in memory 224 and maintained by the ownership module 382 of the storage operating system 300. The table comprises a plurality of entries 410, 420, 430 and 440, one for each disk accessible by the appropriate D-module. The individual fields are depicted for an illustrative entry 420 including a drive identification (ID) field 402, a world wide name field 404, an ownership information field 405 that includes the current owner field 406 and the home owner field 407. Other information is stored in a field 408. The world wide name is a 64-bit identification number which is unique for every device attached to a FC network. World wide names are described in ANSI X3.230-1994, Fibre Channel Physical and Signaling Interface (FC-PH) and Bob Snively, New Identifier Formats Based on IEEE Registration X3T11/96-467, revision 2, which are hereby incorporated by reference. The world wide name is generally loaded into disk drives during manufacturing. A unique name is generated by combining the serial number of the NVRAM card with a set of bits to guarantee uniqueness. It is expressly contemplated that other means for generating a world wide name (or other appropriate standardized unique naming scheme) for file servers (and D-modules) are possible, including, but not limited to adding the manufacturer's name to a processor identification, etc.

Initially, the disk ownership table 400 is generated upon boot up of a node 200. More specifically, I/O services of the disk driver system 390 query all devices (e.g., disks 130) attached to the node. This query requests information as to the nature of the attached disks. Upon completion of the query, the ownership module 382 instructs the disk driver system 390 to read the ownership information from each disk. In response, the disk driver system reads the ownership information from the ownership location on each disk and creates the entries in the disk ownership table 400.

Subsequently, the ownership module 382 accesses the disk ownership table 400 to extract the identification of all disks that are owned by the D-module. The ownership module then verifies the SCSI reservations on each disk owned by that D-module by reading the ownership information stored in on-disk. If the SCSI reservations and on-disk ownership location information do not match, the ownership module changes the SCSI reservation to match the ownership location information. Once the SCSI reservations and ownership location information match for all disks identified as owned by the D-module, the ownership module 382 passes the information to the file system and the RAID-module, which configure the individual disks into the appropriate RAID groups and volumes for the D-module 350. Notably, other embodiments of the invention may not include a RAID system, in which case other suitable processes will perform such tasks as assimilating the disks into aggregates.

Referring again to FIG. 3, the takeover monitor process 376 operates in conjunction with a cluster fabric (CF) interface module 340*b* to monitor the heartbeats between the node and the one or more other nodes in the cluster. If the absence of a heartbeat is detected, the takeover monitor process 376 initiates the takeover procedure. In addition, the takeover monitor is responsive to a storage takeover command by e.g., an administrator. In response to lack of heartbeat or issuance of a storage takeover command, the takeover procedure is enabled and takeover processing begins with the takeover monitor process 376 invoking the takeover routines as defined by the table 362.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 610 (see FIG. 6), in response to a user (system administrator) issuing commands to the node 200. The SCSI target module 335 is generally disposed between the FC and iSCSI drivers 328, 330 and the file system 360 to provide a translation layer of the virtualization system between the block (LUN) space and the file system space, where LUNs are represented as blocks.

The file system 360 is illustratively a message-based system that provides logical volume management capabilities for use in access to the information stored on the storage devices, such as disks. It is noted, however, that logical volume management capabilities are provided by both the file system 360 and the RAID system 380. In addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL® file system (hereinafter generally the "write-anywhere file system") having an on-disk format representation that is block-based using, e.g., 4 kilobyte (kB) blocks and using index nodes ("modes") to identify files and file attributes (such as creation time, access permissions, size and block location). The file system uses files to store metadata describing the layout of its file system; these metadata files include, among others, an mode file. A file handle, i.e., an identifier that includes an mode number, is used to retrieve an mode from disk.

Broadly stated, all modes of the write-anywhere file system are organized into the mode file. A file system (fs) info block specifies the layout of information in the file system and includes an mode of a file that includes all other modes of the file system. Each logical volume (file system) has an fsinfo block. The mode of the mode file may directly reference (point to) data blocks of the mode file or may reference indirect blocks of the mode file that, in turn, reference data blocks of the mode file. Within each data block of the mode file are embedded modes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the mode file using the mode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described is herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, and a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each module includes a CF interface module 340a,b adapted to implement intra-cluster communication among the N- and D-modules, including D-module-to-D-module communication for data container striping operations.

The protocol layers, e.g., the NFS/CIFS layers and the iSCSI/FC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. Thus, any network port of an N-module that receives a client request can access any data container within the single file system image located on any D-module 350 of the cluster.

Further to the illustrative embodiment, the N-module 310 and D-module 350 are implemented as separately-scheduled processes of storage operating system 300; however, in an alternate embodiment, the modules may be implemented as pieces of code within a single operating system process. Communication between an N-module and D-module is thus illustratively effected through the use of message passing between the modules although, in the case of remote communication between an N-module and D-module of different nodes, such message passing occurs over the cluster switching fabric 150. As noted, the cluster switching fabric 150 is also used as a second medium over which heartbeats between the nodes are transmitted and received. A known messagepassing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Patent Application Publication No. US 2002/0116593.

The CF interface module 340 implements the CF protocol for communicating file system commands among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340a on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340b on D-module 350 de-encapsulates the CF message and processes the file system command.

Figure 5:
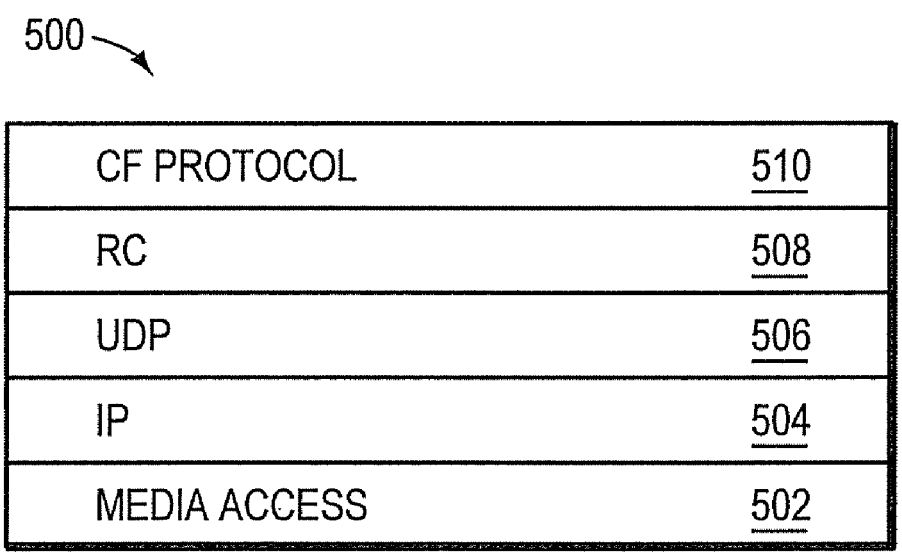
FIG. 5 is schematic block diagram illustrating the format of a cluster fabric (CF) message in accordance with the present invention.

FIG. 5 is a schematic block diagram illustrating the format of a CF message 500 in accordance with an embodiment of the present invention. The CF message 500 is illustratively used for RPC communication over the switching fabric 150 between remote modules of the cluster 100; however, it should be understood that the term "CF message" may be used generally to refer to LPC and RPC communication between modules of the cluster. The CF message 500 includes a media access layer 502, an IP layer 504, a UDP layer 506, a reliable connection (RC) layer 508 and a CF protocol layer 510. As noted, the CF protocol is a generic file system protocol that conveys file system commands related to operations contained within client requests to access data containers stored on the cluster 100; the CF protocol layer 510 is that portion of message 500 that carries the file system commands. For example, the storage system command issued by the administrator in accordance with the invention may be sent over the CF fabric to another storage system node in the cluster, if necessary. Illustratively, the CF protocol is datagram based and, as such, involves transmission of messages or "envelopes" in a reliable manner from a source (e.g., an N-module 310) to a destination (e.g., a D-module 350). The RC layer 508 implements a reliable transport protocol that is adapted to process such envelopes in accordance with a connectionless protocol, such as UDP 506. Further details of the data container configuration and the file system organization are provided in the above cited patent application Ser. No. 11/606, 452 of Coatney et al.

E. Management processes VLDB

Figure 6:
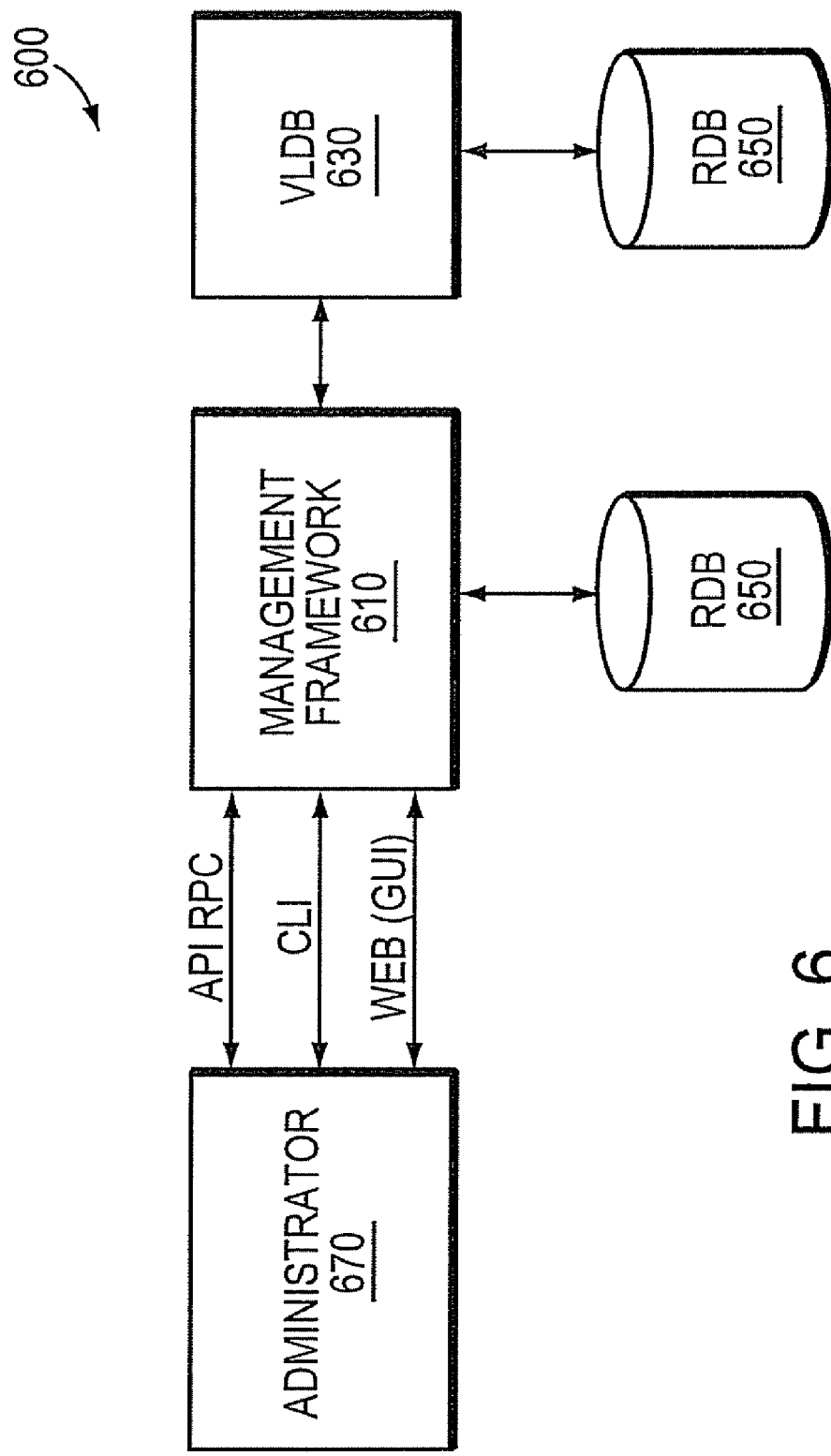
FIG. 6 is a schematic block diagram illustrating a collection of management processes in accordance with an illustrative embodiment of the present invention.

FIG. 6 is a schematic block diagram illustrating a collection of management processes that execute as user mode applications 600 on the storage operating system 300 to provide management of configuration information (i.e., management data) for the nodes of the cluster. To that end, the management processes include a management framework process 610 and a volume location database (VLDB) process 630, each utilizing a data replication service (RDB 650) linked as a library. The management framework 610 provides an administrator 670 interface via a command line interface (CLI) and/or a webbased graphical user interface (GUI). The management framework is illustratively based on a conventional common interface model (CIM) object manager that provides the entity to which users/system administrators interact with a node 200 in order to manage the cluster 100.

The VLDB 630 is a database process that tracks the locations of various storage components (e.g., striped volume sets, (SVSs), volumes, aggregates, etc.) within the cluster 100 to thereby facilitate routing of requests throughout the cluster. In the illustrative embodiment, the N-module 310 of each node accesses a configuration table 235 that maps an identifier, such as a striped volume set identifier of a data container handle to a D-module 350 that "owns" (services) the data container within the cluster. The VLDB includes a plurality of entries which, in turn, provide the contents of entries in the configuration table 235; among other things, these VLDB entries keep track of the locations of the volumes and aggregates within the cluster. Examples of such VLDB entries include a VLDB volume entry 700 (FIG. 7) and a VLDB aggregate entry 800 (FIG. 8).

FIG. 7 is a schematic block diagram of an exemplary VLDB volume entry 700. The entry 700 includes a volume ID field 705, an aggregate ID field 710 and, in alternate embodiments, additional fields 715. The volume ID field 705 contains an ID that identifies a volume 710 used in a volume location process. The aggregate ID field 710 identifies the aggregate containing the volume identified by the volume ID field 705. Likewise, FIG. 8 is a schematic block diagram of an exemplary VLDB aggregate entry 800. The entry 800 includes an aggregate ID field 805, a D-module ID field 810 and, in alternate embodiments, additional fields 815. The aggregate ID field 805 contains an ID of a particular aggregate in the cluster 100. The D-module ID field 810 identifies the D-module hosting the particular aggregate indicated in the aggregate ID field 805.

Notably, the VLDB illustratively implements a RPC interface, e.g., a Sun RPC interface, which allows the N-module 310 to query the VLDB 630. When encountering contents of a data container handle that are not stored in its configuration table, the N-module sends an RPC to the VLDB process. In response, the VLDB 630 returns to the N-module the appropriate mapping information, including an ID of the D-module that owns the data container. The N-module caches the information in its configuration table 235 and uses the D-module ID to forward the incoming request to the appropriate data container. Thus, after a takeover or send home process in accordance with the invention, the N-module is notified of the newly assigned D-module when the VLDB 630 is updated (at the D-module ID field 810 of the VLDB aggregate entry 800).

The functions and interactions between the N-module 310 and D-module 350 are coordinated on a cluster-wide basis through the collection of management processes and RDB library user mode applications. To that end, the management processes have interfaces to (are closely coupled to) RDB 650 (FIG. 6). The RDB comprises a library that provides a persistent object store (storing of objects) for the management data processed by the management processes. Notably, the RDB 650 replicates and synchronizes the management data object store access across all nodes 200 of the cluster 100 to thereby ensure that the RDB database image is identical on all of the nodes 200. At system startup, each node 200 records the status/state of its interfaces and IP addresses (those IP addresses it "owns") into the RDB database.

F. Homeness

As noted, in accordance with the invention, the ownership information for each disk is recorded in an ownership location on each disk 134a (FIG. 1). The actual location in the media may be determined in a particular application of the invention, such as closest to the center of the disk, towards a disk edge or in an area most likely nearest to the drive head. Illustratively, the serial number of the D-module of the current owner and the home owner is stored in an ownership location on each disk. Other ownership information may be stored in the ownership location such as an IP address or a world wide name of a device on the network such as a node with which the particular disk is associated. In addition, ownership information is contained within ownership table 400 of each node, which includes one or more table entries 410, having ownership information field 405 that contains subfield 406 which identifies a current owner for the disk, and home owner field 407, which indicates the home owner for that disk. Notably, the ownership information is stored in the memory of the node (in-core) for all disks attached to that node.

In accordance with a further aspect of the invention, the disk homeness API 388 is accessible by various layers of the storage operating system 300. Disk homeness API 388 includes commands that can be used between modules/layers of the system, and commands that can be used by an administrator at management station 195 (FIG. 1). The disk homeness API 388 includes commands to display, set and modify the homeness information in the ownership location on each disk and in the table 400. The commands are illustratively sent as a RPC message over the cluster fabric interconnect as part of the CF protocol messaging described herein with reference to FIG. 5. It should be understood, however, that other communication methods can be used within the scope of the present invention. Other commands include a "disk assign command" which has an optional parameter wherein the home owner can be set to something different than the current owner. By default the home owner will typically match the current owner.

A disk reassign command is invoked when the storage system is in a maintenance mode and is controlled by an administrator through the management station 195. In maintenance mode, the disk reassign command sets the current owner and home owner to the same value unless the administrator instructs otherwise. After a takeover, as discussed further herein, the disk reassign command is provided to update the homeness information to set the current owner as the takeover node. A storage disk show command results in a display of both the current owner and the home owner on the GUI 196 at management station 195.

As another example, the disk migration module 386 may access the disk ownership table 400 to determine current disk ownership. The disk ownership module 382 continues to update the ownership table 400 during operation of the D-module. If the disk topology changes, these changes are reported using the disk homeness API across the cluster fabric interconnect to the other D-modules in the cluster. Each of the other Dmodules then updates its respective disk ownership table 400 in accordance with the procedure described herein.

The disk iterator 384 in the ownership module 382 of each D-module in the cluster extracts the current owner and the home owner information from the table 400 and from the ownership location on the disks when this information is needed. Notably, when a disk is first assigned ownership to a node, the home owner is set to current owner. More specifically, on boot up, the disk ownership table is populated with the information from the ownership location of the disk; a takeover node that reboots will have disks that show itself (the takeover node) as the current owner, but the original node as the home owner in the homeness information.

The homeness information is used by the cluster takeover monitor process 376 running on each D-module during a takeover and during a send home and by the RAID subsystem 380 in order to reassimilate the volumes into the aggregates after a takeover, and this process is more fully described in the above-cited U.S. patent application Ser. No. 11/606,538.

FIGS. 9A and 9B together form a flowchart 900 of a procedure whereby disk location is controlled using the homeness information of the present invention. The procedure starts at step 902 and continues to step 904 in which the disk homeness API sets the home owner and the current owner as the same for each disk associated with a particular D-module. This can be performed by an administrator (a user) at the management station 195 as discussed. The procedure then continues to step 906, in which the ownership information is written in the ownership location of each disk. The procedure continues to step 908 in which the ownership table 400 is created using the information provided by the disk homeness API. As noted, the ownership module creates table 400 and verifies SCSI reservations on each disk assigned to the D-module, as in step 909. If the SCSI reservations and on-disk information do not match, the ownership module typically is changes the SCSI reservations to match the ownership location information. It should be appreciated that other suitable techniques may also be employed when the invention is implemented in a non-SCSI environment with respect to access and ownership of the disks by the various nodes in the cluster.

Figure 9:
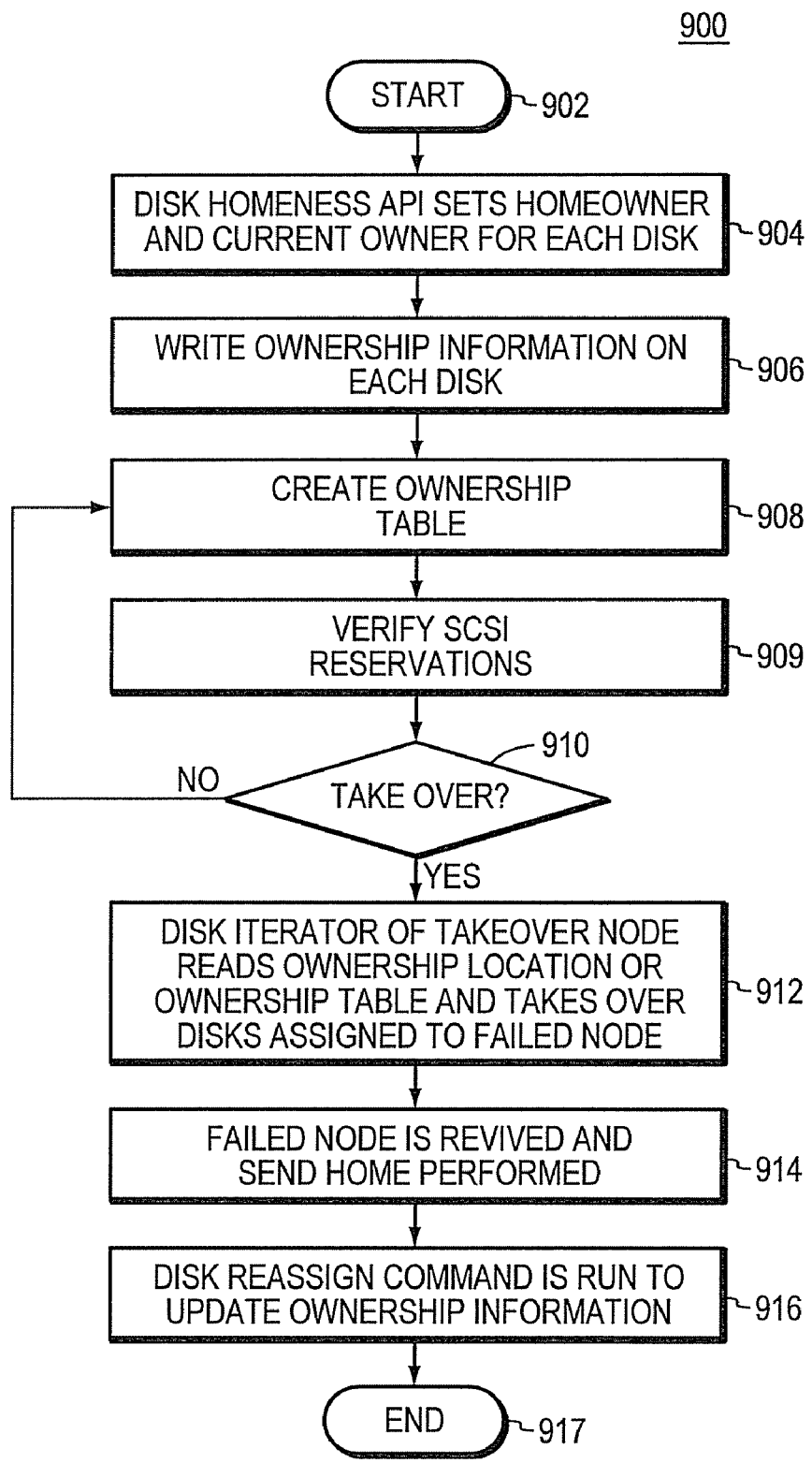
FIG. 9 is a flowchart of a procedure for maintaining disk location via homeness in accordance with an illustrative embodiment of the present invention.

Once the SCSI reservations and on-disk ownership location information match for all the disks identified as being owned by that D-module, the ownership module 382 then passes the information to the RAID system for that module to configure the individual disks into the appropriate RAID groups and volumes for the cluster. The ownership information is thus configured and the node proceeds to serve data access requests that are directed to it. The procedure of FIG. 9 illustrates that the next step 910, is a takeover of another node's disks. If there is not a takeover, there may be no change in the ownership information, However, the information is illustratively re-verified when there is a disk add/remove command, and also verified more frequently, if desired, by rescanning the ownership information for all or a portion of the disks in the cluster. Though the table may not need to be fully recreated each time, this re-scan is advantageous in case another node in a shared storage system may have assigned new disks to this node since the prior scan. These newly assigned disks become apparent to the node upon scanning all the disks and looking for changes. Thus, the figure depicts steps 906 and 908 as being repeated in a loop for purposes of illustration.

If there is a takeover, as in step 910, the procedure continues to step 912. The disk iterator of the takeover node reads ownership location information on each disk or from the (in-core) ownership table and takes over disks assigned to the failed node, and thus the current owner information is updated to reflect the takeover node as being the current owner of those disks. Notably, due to this change, further interaction with the aggregates on those disks is handled as local storage. As noted herein, there is no need for a partner mode, which is advantageous because it reduces code complexity and duplication. The takeover process using the homeness information is described in further detail in commonly owned U.S. patent application Ser. No. 11/606,727 of Coatney et al., filed on even date herewith.

In accordance with step 914, when the failed node is revived, a send home procedure is performed. More specifically, the disks are reassigned to the previously failed node by changing the ownership location information on those disks to once again refer to its original node, which is now a waiting node. Further details of the send home procedure are provided in commonly owned U.S. patent application Ser. No. 11/606, 452 of Coatney et al., filed on even date herewith. This aspect of the inventive procedure ends at step 917.

Figure 10:
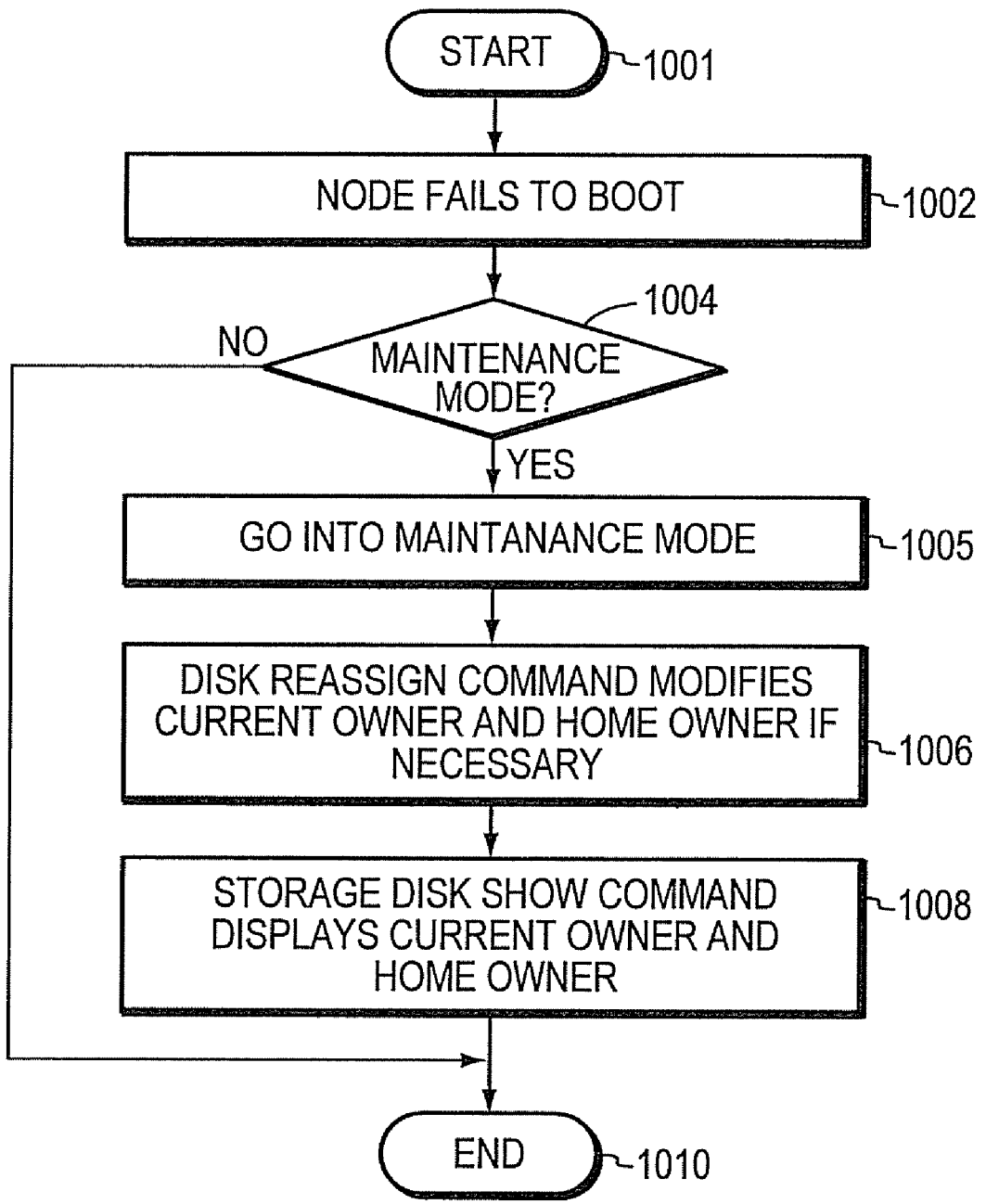
FIG. 10 is a flowchart illustrating several alternative aspects of the procedure of the present invention.

FIG. 10 illustrates several other aspects of the procedure of the present invention that can be used in various circumstances. The procedure begins at step 1001 and continues to step 1002, in which a node fails to boot, for example. In such a case, briefly, a disk reassign command may be sent by a user to a node to perform a disk reassign which includes instructions to update the ownership information in order to modify it if necessary to allow the node to takeover a failed node's disks. This can occur, as stated by way of example, if a node fails to boot, or if the node is being replaced, or otherwise is subject to a takeover by another node. In still other circumstances, the procedure allows for the node to check for a maintenance mode. This is shown in step 1004. If an administrator has invoked a maintenance mode, the procedure continues to step 1005 and the system goes into maintenance mode. Then, it may necessary to reconfigure the cluster. In that case, or if a takeover is invoked, the procedure continues to step 1006, and a disk reassign command modifies the current owner and home owner, if necessary, in accordance with a possible reconfiguration of the cluster. In accordance with step 1008, the storage disk show command can be used to display both current owner and home owner information returned from the disk iterator with respect to each disk in the cluster, or with respect with a particular D-module. The procedure ends at step 1010.

As noted, the disk ownership module 382 continues to update the disk ownership table during the operation of the cluster. Thus, when the disk topology changes as a result of a takeover, maintenance mode, drives being added to the configuration, or otherwise (i.e. for load balancing), the disk homeness API can be used to reassign those disks.

It should be understood by those skilled in the art that the ownership information provided in accordance with the invention, as well as the disk homeness API of the invention, allow any D-module in the cluster to access the disks directly to find home owner information. An administrator can also access the disk ownership table of a D-module to determine the home owner information of the disks. Unlike prior techniques, there is no need to require that failover is performed by a partner because that partner is the only other D-module which has the information about the disks. Thus, any D-module or any group of D-modules can be assigned to take over disks assigned to another D-module. This allows for greater flexibility and load balancing within the cluster.

The foregoing description has been directed to particular embodiments of the invention. It will be apparent, however, that other variations and modifications may be made to the described embodiments with the attainment of some or all of their advantages. Specifically, it should be noted that the principles of the invention may be implemented in a non-distributed file system. Furthermore, while this description has been written in terms of D and N-modules, the teachings of the present invention are equally suitable to systems in which the functionality of the N and D-modules are implemented in a single system. Alternatively, the functions of the N and D-modules may be distributed among a number of separate systems, wherein in each system performs one or more functions. Additionally, the features of the present invention have been described with respect to a cluster, which contains two nodes, however, it is equally applicable to clusters including a plurality of nodes, which allow for an n-way failover. Additionally, the procedures, processes and/or modules described herein may be implemented in hardware, software, embodied as a computer readable medium having program instructions, for one or a combination thereof. Therefore, it is the object of the appended claims to cover all such variations and modifications as come within the true spirit and scope of the invention.

What is claimed is:

1. A method for maintaining resource location information, comprising:
   organizing a plurality of nodes as a cluster, wherein each node comprises a processor and a memory and each node is coupled to one or more resources;
   maintaining, on each resource of the cluster, ownership information comprising a current owner identifying a node that currently serves data access requests directed to the resource and a home owner identifying an originally assigned node that serves the data access requests directed to the resource when the originally assigned node is operational; and
   utilizing, by a takeover node, the ownership information to identify an identified resource, of the one or more resources, served by a failed node, the takeover node using the ownership information to perform a takeover of the identified resource, wherein the ownership information is updated with information from the takeover node.

2. The method of claim 1, further comprising storing the ownership information for each resource in a table at each node of the cluster.

3. The method of claim 1, further comprising in response to a failure of the failed node, generating a message to one or more nodes instructing the one or more nodes to read the ownership information of the identified resource when performing the takeover.

4. The method of claim 1, further comprising issuing commands at a remote management station to perform at least one of setting, modifying and displaying the ownership information.

5. The method of claim 1, wherein the home owner is the failed node and once the failed node is brought back into service, reassigning the home owner to service the data access requests for the identified resource.

6. The method of claim 1, wherein the ownership information is updated with information from the takeover node further comprising assigning the takeover node as the current owner.

7. A method for maintaining resource location information, comprising:
   organizing a plurality of nodes as a cluster, wherein each node comprises a processor and a memory and each node is coupled to one or more resources;
   maintaining, on each resource of the cluster, ownership information comprising a current owner identifying a node that currently serves data access requests directed to the resource and a home owner identifying an originally assigned node that serves the data access requests directed to the resource when the originally assigned node is operational; and
   utilizing, by a takeover node, the ownership information to identify an identified resource, of the one or more resources, served by a failed node, wherein the takeover node uses the ownership information to perform a takeover of the identified resource.

8. The method of claim 7, further comprising storing the ownership information for each resource in a table at each node of the cluster.

9. The method of claim 7, further comprising in response to a failure of the failed node, generating a message to one or more nodes instructing the one or more nodes to read the ownership information of the identified resource when performing the takeover.

10. The method of claim 7, further comprising issuing commands at a remote management station to perform at least one of setting, modifying and displaying the ownership information.

11. The method of claim 7, wherein the home owner is the failed node and once the failed node is brought back into service, reassigning the home owner to service the data access requests for the identified resource.

12. The method of claim 7, further comprising updating, in response to the takeover, the ownership information for the identified resource to reflect the takeover node as being the current owner.

13. A storage network, comprising:
   a plurality of storage system nodes organized as a cluster, wherein each node comprises a processor and a memory;
   one or more resources coupled to each node wherein each of the one or more resources maintains ownership information comprising a current owner identifying a node that currently serves data access requests directed to the resource and a home owner identifying an originally assigned node that serves the data access requests directed to the resource when the originally assigned node is operational; and
   a takeover node configured to read the ownership information to identify an identified resource, of the one or more resources, served by a failed node, the takeover node further configured to perform a takeover of the identified resource using the read ownership information.

14. The storage network of claim 13, further comprising a table at each node of the cluster to store the ownership information.

15. The storage network of claim 13, further comprising in response to a failure of the failed node, the failed node no longer sending a message to other nodes of the cluster.

16. The storage network of claim 13, further comprising a remote management station configured to issue commands to perform at least one of setting, modifying and displaying the ownership information.

17. The storage network of claim 13, wherein the home owner is the failed node and once the failed node is brought back into service, the home owner reassigned to service the data access requests for the identified resource.

18. The storage network of claim 13, wherein the ownership information for the identified resource is updated to reflect the takeover node as the current owner.

* * * * *

UNITED STATES PATENT AND TRADEMARK OFFICE
CERTIFICATE OF CORRECTION

| | |
|---|---|
| PATENT NO. | : 8,041,736 B1 |
| APPLICATION NO. | : 12/716770 |
| DATED | : October 18, 2011 |
| INVENTOR(S) | : Steven S. Watanabe |

It is certified that error appears in the above-identified patent and that said Letters Patent is hereby corrected as shown below:

Title Page, Item (57) Abstract:
A method and system manages ownership information about disks in a storage network without the need for an emulated, partner mode system. The method and system provides for ownership information, including a current owner and a home owner for resources, such as disks, to be stored on each disk in a storage system, as well as to be stored in memory on each storage system node in the network. A further aspect of the invention is a disk homeness application program interface (API), which provides commands that can be utilized by an administrator at a host computer to set, modify and ~~disce play~~display ownership information about each disk in the cluster. Upon a takeover, any node in the network can takeover one or more disks by reading the ownership information stored on the disks or in the tables."

Col. 1, line 53 should read as follows: computer ~~is~~ network comprising a geographically distributed"

Col. 3, line 5 should read as follows: "storage system nodes, ~~is~~ operate using the concept of partner"

Col. 3, line 47 should read as follows: "clients over a computer ~~is~~ network while each D-module"

Col. 3, line 54 should read as follows: "2003 (the contents of which are ~~zo~~ incorporated herein by"

Col. 4, line 25 should read as follows: "cluster, as well ~~is~~ as to be stored in memory on each storage"

Col. 6, line 17 should read as follows: "one or more storage devices, such as ~~is~~ disks 130a. The nodes"

Signed and Sealed this
Twenty-eighth Day of February, 2012

David J. Kappos
*Director of the United States Patent and Trademark Office*

Col. 6, line 54 should read as follows: "a client/server model of information delivery. That is, ~~is~~ each"

Col. 7, line 30 should read as follows: "stored. As noted, the clustered ~~is~~ storage system 100 is con-"

Col. 10, line 34 should read as follows: "cifically, a disk iterator module 384 and a disk migration ~~is~~"

Col. 12, line 9 should read as follows: "tees, such as ~~minoring~~mirroring and/or parity (RAID). The file system"

Col. 12, line 13 should read as follows: "4 kilobyte (kB) blocks and using index nodes (~~"modes"~~)("inodes") to"

Col. 12, lines 17-19 should read as follows: "these metadata files include, among others, an ~~mode~~inode file. A file handle, i.e., an identifier that includes an ~~mode~~inode number, is used to retrieve an ~~mode~~inode from disk."

Col. 12, lines 20-29 should read as follows: "Broadly stated, all ~~modes~~inodes of the write-anywhere file system are organized into the ~~mode~~inode file. A file system (fs) info block specifies the layout of information in the file system and includes an ~~mode~~inode of a file that includes all other ~~modes~~inodes of the file system. Each logical volume (file system) has an fsinfo block. The ~~mode~~inode of the ~~mode~~inode file may directly reference (point to) data blocks of the ~~mode~~inode file or may reference indirect blocks of the ~~mode~~inode file that, in turn, reference data blocks of the ~~mode~~inode file. Within each data block of the ~~mode~~inode file are embedded ~~modes~~inodes, each of which may reference indi-"

Col. 12, line 41 should read as follows: "the ~~mode~~inode file using the ~~mode~~inode number to access an appropriate"

Col. 13, line 2 should read as follows: "ous processes, architectures and procedures described ~~is~~"

Col. 17, line 29 should read as follows: "cally ~~is~~ changes the SCSI reservations to match the ownership"